US012675108B2

(12) United States Patent (10) Patent No.: US 12,675,108 B2
Hayashi et al. (45) Date of Patent: Jul. 7, 2026

(54) VEHICLE, INFORMATION PROCESSING SYSTEM, PROGRAM, AND TERMINAL DEVICE

(71) Applicant: TOYOTA JIDOSHA KABUSHIKI KAISHA, Toyota (JP)

(72) Inventors: Masatoshi Hayashi, Nisshin (JP); Josuke Yamane, Nagoya (JP); Daigo Fujii, Nagoya (JP); Yuki Tatsumoto, Seto (JP); Takurou Sakai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 649 days.

(21) Appl. No.: 18/129,988

(22) Filed: Apr. 3, 2023

(65) Prior Publication Data

US 2023/0409029 A1 Dec. 21, 2023

(30) Foreign Application Priority Data

Jun. 15, 2022 (JP) ................................. 2022-096851

(51) Int. Cl.
*G05D 1/00* (2024.01)
*H04N 23/60* (2023.01)

(52) U.S. Cl.
CPC ......... *G05D 1/0038* (2013.01); *G05D 1/0027* (2013.01); *G05D 1/0287* (2013.01); *H04N 23/60* (2023.01)

(58) Field of Classification Search
CPC .. G05D 1/0038; G05D 1/0027; G05D 1/0287; H04N 23/60
See application file for complete search history.

(56) References Cited

U.S. PATENT DOCUMENTS

| | | | |
|---|---|---|---|
| 10,467,581 B2 * | 11/2019 | Laury | G06Q 10/0836 |
| 11,397,913 B2 * | 7/2022 | Colella | G06Q 10/08355 |
| 2015/0310381 A1 | 10/2015 | Lyman et al. | |
| 2019/0130342 A1 * | 5/2019 | Maheshwari | G06Q 10/083 |
| 2020/0339161 A1 | 10/2020 | Otaki et al. | |
| 2021/0295242 A1 * | 9/2021 | Rathi | G06Q 10/0832 |
| 2022/0083963 A1 | 3/2022 | Tanaka | |

FOREIGN PATENT DOCUMENTS

| | | |
|---|---|---|
| JP | 2020-181287 A | 11/2020 |
| JP | 2022-047000 A | 3/2022 |

* cited by examiner

*Primary Examiner* — Scott A Browne
*Assistant Examiner* — Lidia Kwiatkowska
(74) *Attorney, Agent, or Firm* — Dinsmore & Shohl LLP

(57) ABSTRACT

A vehicle that autonomously delivers a package includes a control unit that captures a first image when the vehicle leaves the package at a first position and transmits the first image to a user and drives the vehicle such that a delivery point is corrected from the first position to a second position based on correction information for correcting the delivery point, the correction information being information from the user who has confirmed the first image, when receiving the correction information.

18 Claims, 7 Drawing Sheets

FIG. 7

VEHICLE, INFORMATION PROCESSING SYSTEM, PROGRAM, AND TERMINAL DEVICE

CROSS-REFERENCE TO RELATED APPLICATION

This application claims priority to Japanese Patent Application No. 2022-096851 filed on Jun. 15, 2022, incorporated herein by reference in its entirety.

BACKGROUND

1. Technical Field

The present disclosure relates to a vehicle, an information processing system, a program, and a terminal device.

2. Description of Related Art

Conventionally, a technique for automatically delivering a package using an autonomous driving vehicle has been known. For example, Japanese Unexamined Patent Application Publication No. 2020-181287 (JP 2020-181287 A) discloses an automatic driving delivery system in which a delivery point of a package is more appropriately presented to a user. In such an automatic driving delivery system, a first delivery candidate point or a second delivery candidate point is determined as the delivery point, and before the autonomous driving vehicle starts delivering the package to the determined delivery point, the determined delivery point is presented to the user.

SUMMARY

However, in the above technique, sufficient consideration has not been given to unattended delivery performed when the user as a recipient is not at home and cannot receive the package, for example. It is necessary to suppress the package from being left at a location that is not desired by the user including at least one of the recipient and a sender.

The present disclosure provides a technique that suppresses the package from being left at a location that is not desired by the user.

A vehicle according to an embodiment of the present disclosure is a vehicle that autonomously delivers a package, and includes a control unit that captures a first image when the vehicle leaves the package at a first position and transmits the first image to a user and drives the vehicle such that a delivery point is corrected from the first position to a second position based on correction information for correcting the delivery point, the correction information being information from the user who has confirmed the first image, when receiving the correction information.

A program according to the embodiment of the present disclosure causes a vehicle that autonomously delivers a package to execute an operation including: capturing a first image when the vehicle leaves the package at a first position and transmitting the first image to a user; receiving correction information for correcting a delivery point, the correction information being information from the user who has confirmed the first image; and driving the vehicle such that the delivery point is corrected from the first position to a second position based on the correction information.

A terminal device according to the embodiment of the present disclosure is a terminal device of a user that is connected to a vehicle that autonomously delivers a package so as to be able to communicate with the vehicle, and includes a control unit that receives a first image when the vehicle leaves the package at a first position, receives correction information for driving the vehicle such that a delivery point is corrected from the first position to a second position, the correction information being information from the user who has confirmed the first image, and transmits the correction information to the vehicle.

A vehicle, an information processing system, a program, and a terminal device according to the embodiment of the present disclosure suppress the package from being left at a location that is not desired by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a schematic diagram for describing a processing content in the terminal device shown in FIG. 1.

DETAILED DESCRIPTION OF EMBODIMENTS

Hereinafter, an embodiment of the present disclosure will be described below with reference to the drawings.

Figure 1:
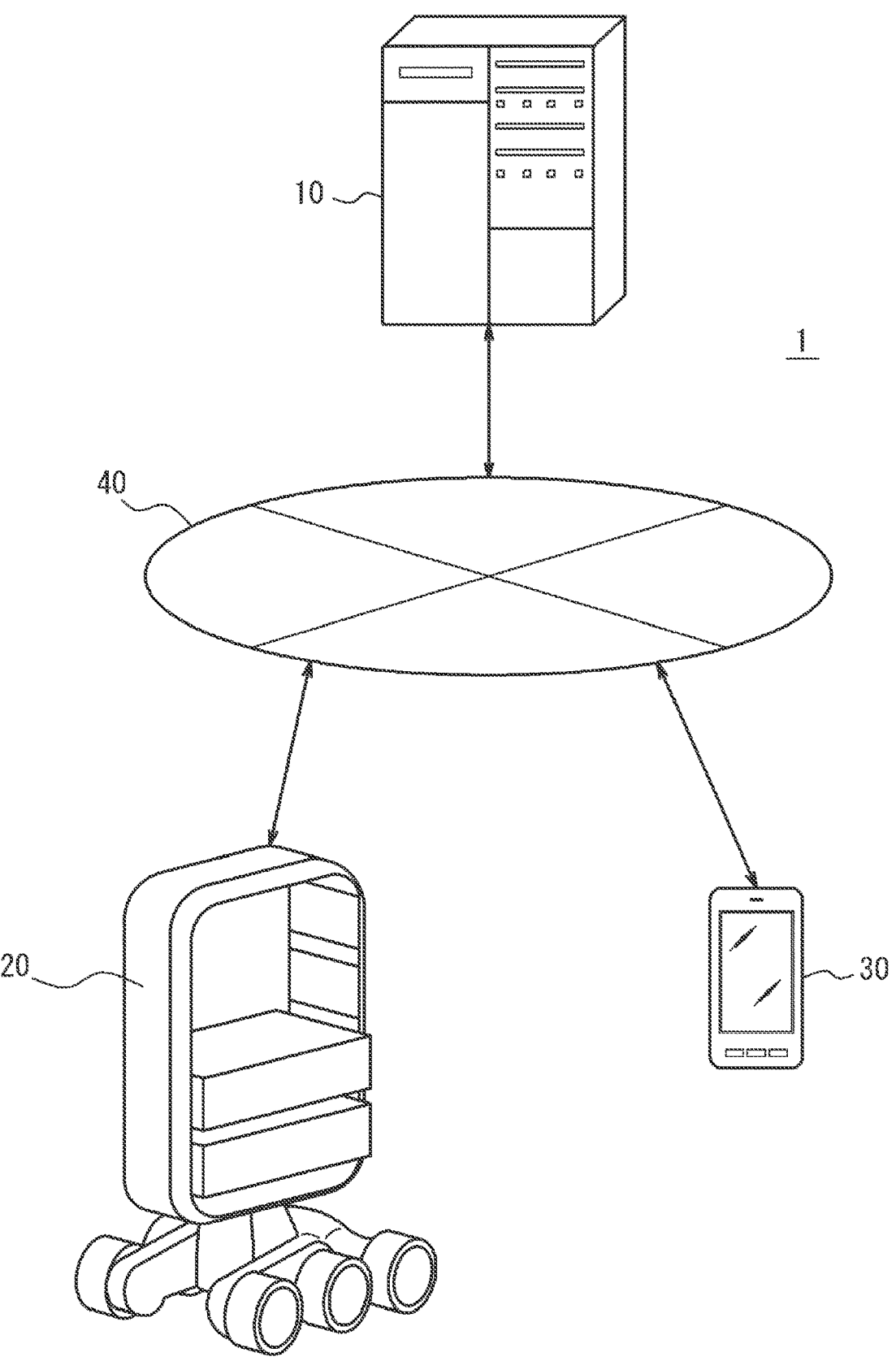
FIG. 1 is a configuration diagram showing a configuration of an information processing system including a vehicle according to an embodiment of the present disclosure.

FIG. 1 is a configuration diagram showing a configuration of an information processing system 1 including a vehicle 20 according to the embodiment of the present disclosure. An overview of the information processing system 1 including the vehicle 20 according to the embodiment of the present disclosure will be mainly described with reference to FIG. 1. The information processing system 1 includes an information processing device 10 and a terminal device 30 in addition to the vehicle 20.

For convenience of description, FIG. 1 shows only a single vehicle 20. However, the number of the vehicles 20 included in the information processing system 1 may be two or more. For convenience of description, FIG. 1 shows a single information processing device 10 and a single terminal device 30. However, the numbers of the information processing devices 10 and the terminal devices 30 included in the information processing system 1 may be two or more. Each of the information processing device 10, the vehicle 20, and the terminal device 30 is connected to a network 40 including a mobile communication network and the Internet so as to be able to communicate with each other.

The information processing device 10 is one server or a plurality of servers that can communicate with each other.

The information processing device 10 is not limited to the above, and may be any general-purpose electronic device such as a personal computer (PC) or a smartphone, or may be another electronic device dedicated to the information processing system 1.

The vehicle 20 includes any electrified vehicle that travels between points by autonomous driving. The vehicle 20 includes, for example, a small delivery vehicle that autonomously delivers the package in an unmanned state. The vehicle 20 is not limited to this, and may include any electrified vehicle that performs manned autonomous driving.

The vehicle 20 autonomously delivers the package to at least one delivery destination. When the vehicle 20 arrives at the delivery destination, the vehicle 20 delivers the package addressed to the user as a recipient at the delivery destination to the user. When the vehicle 20 cannot directly deliver the package to the recipient due to the absence of the recipient at the delivery destination, the vehicle 20 leaves the package at a location specified by the user including at least one of the recipient and a sender, or does not leave the package and take this back as necessary.

The terminal device 30 is a general-purpose electronic device such as a smartphone or a PC. The terminal device 30 is, for example, an electronic device used by the user including at least one of the recipient who receives the package delivered by the vehicle 20 and the sender who sends the package by the vehicle 20. The terminal device 30 is not limited to these, and may be one server device used by the user, a plurality of server devices capable of communicating with each other, or an electronic device dedicated to the information processing system 1.

As an overview of the embodiment, the vehicle 20 autonomously delivers the package. The vehicle 20 captures a first image when the vehicle 20 leaves the package at a first position and transmits the first image to the user. When the vehicle 20 receives correction information for correcting a delivery point, the correction information being information from the user who has confirmed the first image, the vehicle 20 corrects the delivery point from the first position to a second position based on the correction information.

In the present disclosure, the "user" includes, for example, at least one of the recipient and the sender. The "unattended delivery" means that the vehicle 20 leaves the package at a predetermined location, for example, when the package cannot be received directly due to the absence of the user as the recipient at the delivery destination. The "correction information" includes any information for the vehicle 20 to correct the delivery point from the first position that is not desired by the user as the delivery point of the package to the second position that is desired by the user, when the package is left.

Figure 2:
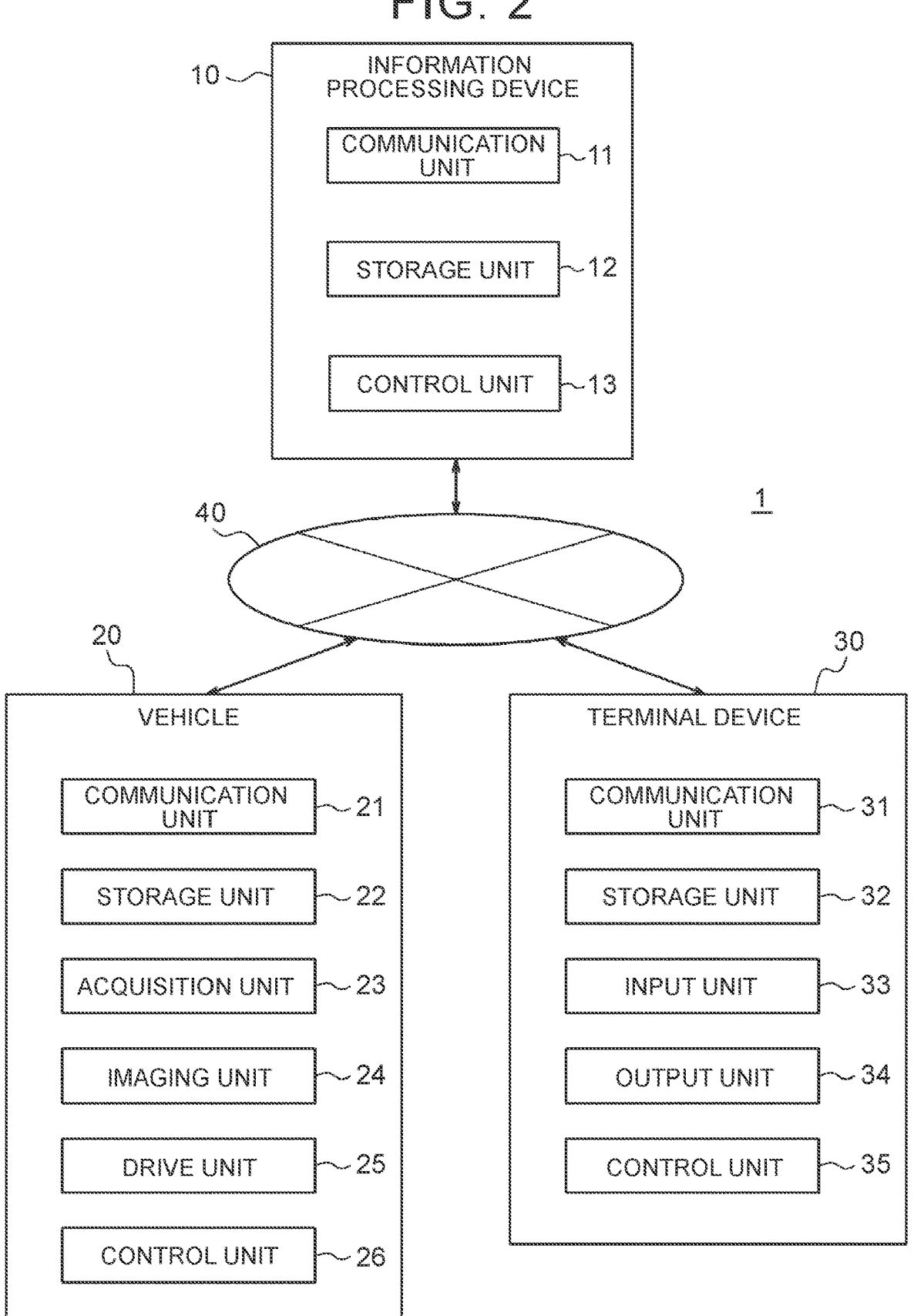
FIG. 2 is a functional block diagram showing a schematic configuration of each of an information processing device, the vehicle, and a terminal device shown in FIG. 1.

FIG. 2 is a functional block diagram showing a schematic configuration of each of the information processing device 10, the vehicle 20, and the terminal device 30 shown in FIG. 1. With reference to FIG. 2, an example of configurations of the information processing device 10, the vehicle 20, and the terminal device 30 included in the information processing system 1 will be mainly described.

As shown in FIG. 2, the information processing device 10 includes a communication unit 11, a storage unit 12, and a control unit 13.

The communication unit 11 includes a communication module connected to the network 40. For example, the communication unit 11 includes a communication module corresponding to a mobile communication standard such as the fourth generation (4G) and the fifth generation (5G), or an Internet standard. According to the embodiment, the information processing device 10 is connected to the network 40 via the communication unit 11. The communication unit 11 transmits and receives various types of information via the network 40.

The storage unit 12 is, for example, a semiconductor memory, a magnetic memory, or an optical memory. However, the storage unit 12 is not limited to these memories. The storage unit 12 functions as a main storage device, an auxiliary storage device, or a cache memory. The storage unit 12 stores any information used for the operation of the information processing device 10. The storage unit 12 stores a system program, an application program, various types of information received or transmitted by the communication unit 11, and the like. The information stored in the storage unit 12 can be updated with the information received from the network 40 via the communication unit 11.

The control unit 13 includes one or more processors. According to the embodiment, the "processor" is a general-purpose processor or a dedicated processor specialized for specific processing. However, the processor is not limited thereto. The control unit 13 is connected to each of the components constituting the information processing device 10 so as to be able to communicate with each other and controls the operation of the entire information processing device 10.

The configuration of the vehicle 20 included in the information processing system 1 will be mainly described. As shown in FIG. 2, the vehicle 20 includes a communication unit 21, a storage unit 22, an acquisition unit 23, an imaging unit 24, a drive unit 25, and a control unit 26. The communication unit 21, the storage unit 22, the acquisition unit 23, the imaging unit 24, the drive unit 25, and the control unit 26 are connected so as to be able to communicate with each other via, for example, a dedicated line.

The communication unit 21 includes a communication module connected to the network 40. For example, the communication unit 21 includes a communication module corresponding to the mobile communication standard such as the 4G and the 5G. According to the embodiment, the vehicle 20 is connected to the network 40 via the communication unit 21. The communication unit 21 transmits and receives various types of information via the network 40.

The storage unit 22 is, for example, a semiconductor memory, a magnetic memory, or an optical memory. However, the storage unit 22 is not limited to these memories. The storage unit 22 functions as a main storage device, an auxiliary storage device, or a cache memory. The storage unit 22 stores any information used for the operation of the vehicle 20. The storage unit 22 stores a system program, an application program, various types of information received or transmitted by the communication unit 21, and the like. The information stored in the storage unit 22 can be updated with the information received from the network 40 via the communication unit 21.

The acquisition unit 23 includes one or more receivers corresponding to any satellite positioning system. For example, the acquisition unit 23 includes a global positioning system (GPS) receiver. The acquisition unit 23 acquires a measured value of the position of the vehicle 20 as the position information. The position information includes an address, a latitude, a longitude, an altitude, and the like. The acquisition unit 23 can acquire the position information of the vehicle 20. The acquisition unit 23 may acquire the position information of the vehicle 20 constantly or may acquire the position information periodically or irregularly.

The imaging unit 24 includes any imaging module capable of capturing an image of a surrounding area of the vehicle 20. For example, the imaging unit 24 includes one or more cameras. Each camera included in the imaging unit 24 is arranged at an appropriate position of the vehicle 20 such that the image of the surrounding area of the vehicle 20 can be captured. For example, the imaging unit 24 includes at least one of a front camera capable of capturing an image of a subject in front of the vehicle 20 and a rear camera capable of capturing an image of a subject behind the vehicle 20. The imaging unit 24 is not limited to this, and the imaging unit 24 may include an omnidirectional camera capable of capturing an image of the entire surrounding area of the vehicle 20.

The drive unit 25 includes any drive mechanism that allows loading of the package on the vehicle 20, delivery of the package loaded on the vehicle 20 to the user, unloading of the package loaded on the vehicle 20 to the delivery point of the package, and movement of the package unloaded at the predetermined position to a different position. For example, the drive unit 25 includes at least one of an arm mechanism driven by a motor and a slide mechanism that can slide the package linearly and that can move the package in and out of the main body of the vehicle 20.

The control unit 26 includes one or more processors. According to the embodiment, the "processor" is a general-purpose processor or a dedicated processor specialized for specific processing. However, the processor is not limited thereto. The control unit 26 is connected to each component constituting the vehicle 20 so as to be able to communicate with each other and controls the operation of the entire vehicle 20.

The configuration of the terminal device 30 included in the information processing system 1 will be mainly described. As shown in FIG. 2, the terminal device 30 includes a communication unit 31, a storage unit 32, an input unit 33, an output unit 34, and a control unit 35.

The communication unit 31 includes a communication module connected to the network 40. For example, the communication unit 31 includes a communication module corresponding to the mobile communication standard such as the 4G and the 5G or the Internet standard. According to the embodiment, the terminal device 30 is connected to the network 40 via the communication unit 31. The communication unit 31 transmits and receives various types of information via the network 40.

The storage unit 32 is, for example, a semiconductor memory, a magnetic memory, or an optical memory. However, the storage unit 32 is not limited to these memories. The storage unit 32 functions as a main storage device, an auxiliary storage device, or a cache memory. The storage unit 32 stores any information used for the operation of the terminal device 30. The storage unit 32 stores a system program, an application program, various types of information received or transmitted by the communication unit 31, and the like. The information stored in the storage unit 32 can be updated with the information received from the network 40 via the communication unit 31.

The input unit 33 includes one or more input interfaces that detect user input and acquire input information based on the user's operation. For example, the input unit 33 includes a physical key, a capacitive key, a touch screen integrated with a display of the output unit 34, a microphone that accepts voice input, and the like.

The output unit 34 includes one or more output interfaces that output information to notify the user. For example, the output unit 34 includes a display that outputs information as video and a speaker that outputs information as voice.

The control unit 35 includes one or more processors. According to the embodiment, the "processor" is a general-purpose processor or a dedicated processor specialized for specific processing. However, the processor is not limited thereto. The control unit 35 is connected to each of the components constituting the terminal device 30 so as to be able to communicate with each other and controls the operation of the entire terminal device 30.

Figure 3:
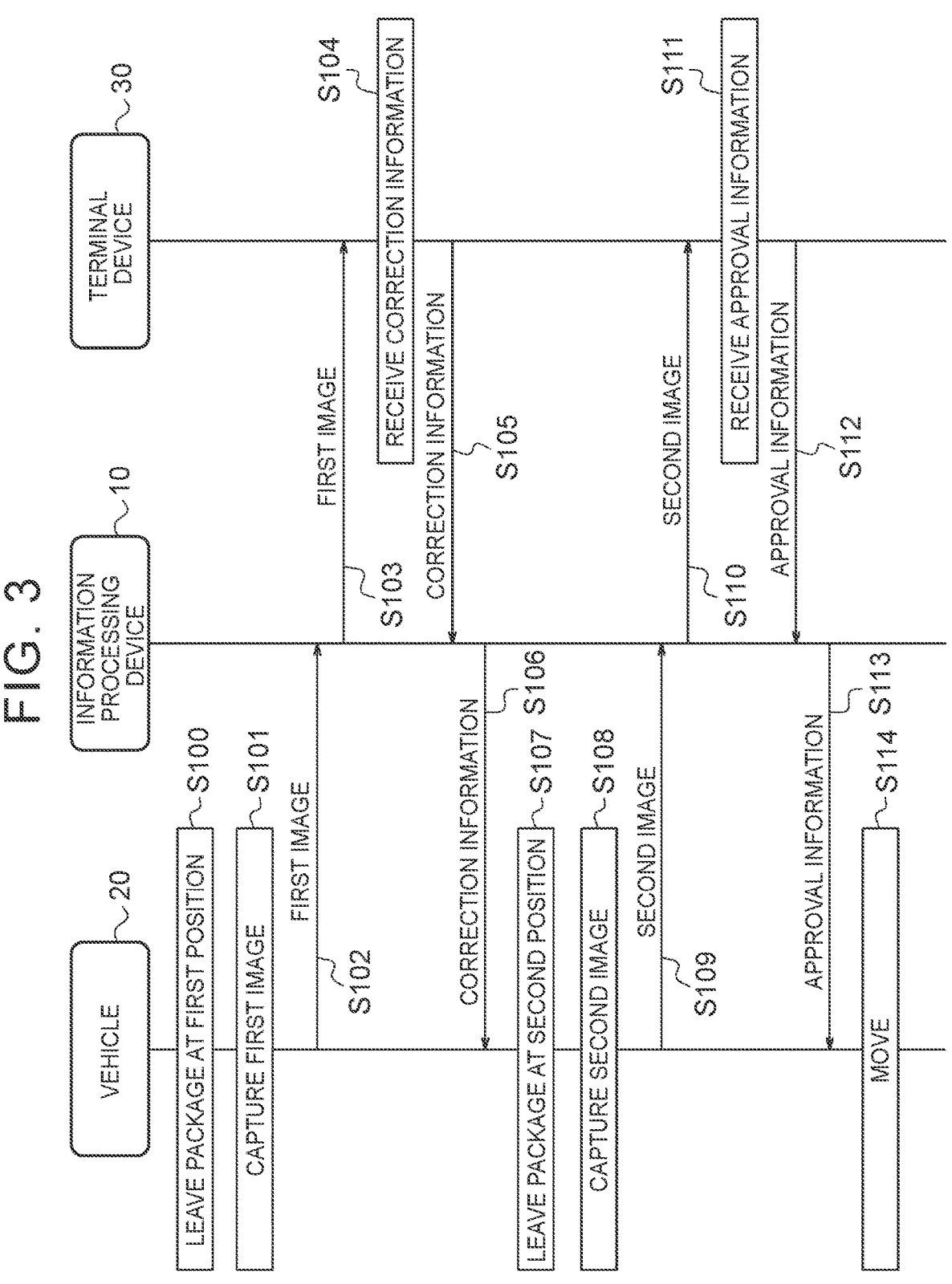
FIG. 3 is a sequence diagram for describing a first example of an information processing method executed by the information processing system shown in FIG. 1.

FIG. 3 is a sequence diagram for describing a first example of an information processing method executed by the information processing system 1 shown in FIG. 1. The first example of the information processing method executed by the information processing system 1 shown in FIG. 1 will be mainly described with reference to FIG. 3. The sequence diagram shown in FIG. 3 shows a basic processing flow of the information processing method executed by the information processing system 1 before a predetermined time elapses since the vehicle 20 left the package at the first position. In the present disclosure, the "predetermined time" is, for example, the time at which the vehicle 20 starts moving from the delivery point to the next destination, and includes the time that elapses since the vehicle 20 left the package at the first position.

In step S100, the control unit 26 of the vehicle 20 drives the vehicle 20 such that the vehicle 20 autonomously delivers the package, determines any first position in the recipient's receiving address as the delivery point, and leaves the package at the first position.

In step S101, the control unit 26 of the vehicle 20 captures a first image when the vehicle 20 leaves the package at the first position using the imaging unit 24.

In step S102, the control unit 26 of the vehicle 20 transmits the first image captured using the imaging unit 24 in step S101 to the user. More specifically, the control unit 26 first transmits the first image to the information processing device 10 via the network using the communication unit 21. Accordingly, the control unit 13 of the information processing device 10 receives the first image from the vehicle 20 via the network 40 and the communication unit 11.

In step S103, the control unit 13 of the information processing device 10 transmits the first image received in step S102 to the terminal device 30 via the communication unit 11 and network 40. Accordingly, the control unit 35 of the terminal device 30 receives the first image when the vehicle 20 leaves the package at the first position from the information processing device 10 via the network 40 and the communication unit 31.

In step S104, the control unit 35 of the terminal device 30 displays the first image acquired in step S103 using the output unit 34, and allows the user to confirm the first image. The control unit 35 receives correction information for driving the vehicle 20 such that the delivery point is corrected from the first position to the second position, the correction information being information from the user who has confirmed the first image, using the input unit 33.

For example, the control unit 35 receives the correction information when the user performs the selection operation on a position corresponding to the second position in the first image while using the input unit 33 of the terminal device 30. In the present disclosure, the "selection operation" includes, for example, an operation using a physical key, an operation using a capacitive key, a touch operation to a touch screen integrated with a display of the output unit 34, a voice operation using a microphone that accepts voice input, and the like.

In step S105, the control unit 35 of the terminal device 30 transmits the correction information received in step S104 to the vehicle 20. More specifically, the control unit 35 first transmits the correction information to the information processing device 10 via the network 40 using the communication unit 31. Accordingly, the control unit 13 of the information processing device 10 receives the correction information from the terminal device 30 via the network 40 and the communication unit 11.

In step S106, the control unit 13 of the information processing device 10 transmits the correction information received in step S105 to the vehicle 20 via the communication unit 11 and the network 40. Accordingly, the control unit 26 of the vehicle 20 receives the correction information for correcting the delivery point, the correction information being information from the user who has confirmed the first image, from the information processing device 10 via the network 40 and the communication unit 21. For example, the control unit 26 receives the correction information when the user performs the selection operation on the position corresponding to the second position in the first image while using the terminal device 30 from the information processing device 10 via the network 40 and the communication unit 21.

In step S107, the control unit 26 of the vehicle 20 drives the vehicle 20 such that the delivery point is corrected from the first position to the second position based on the correction information acquired in step S106. That is, the control unit 26 drives the vehicle 20 such that the package is left at the second position specified by the user. For example, when the control unit 26 receives the correction information before the predetermined time elapses since the vehicle 20 left the package at the first position in step S100, the control unit 26 drives the vehicle 20 such that the delivery point is corrected from the first position to the second position based on the correction information.

In step S108, the control unit 26 of the vehicle 20 captures a second image when the vehicle 20 leaves the package at the second position by correction of the delivery point using the imaging unit 24.

In step S109, the control unit 26 of the vehicle 20 transmits the second image captured using the imaging unit 24 in step S108 to the user. More specifically, the control unit 26 first transmits the second image to the information processing device 10 via the network 40 using the communication unit 21. Accordingly, the control unit 13 of the information processing device 10 receives the second image from the vehicle 20 via the network 40 and the communication unit 11.

In step S110, the control unit 13 of the information processing device 10 transmits the second image received in step S109 to the terminal device 30 via the communication unit 11 and the network 40. Accordingly, the control unit 35 of the terminal device 30 receives the second image when the vehicle 20 leaves the package at the second position by correction of the delivery point via the network 40 and the communication unit 31.

In step S111, the control unit 35 of the terminal device 30 displays the second image acquired in step S110 using the output unit 34, and allows the user to confirm the second image. The control unit 35 receives, using the input unit 33, approval information in which the user approves that the delivery point is the second position, the approval information being information from the user who has confirmed the second image.

In step S112, the control unit 35 of the terminal device 30 transmits the approval information received in step S111 to the vehicle 20. More specifically, the control unit 35 first transmits the approval information to the information processing device 10 via the network 40 using the communication unit 31. Accordingly, the control unit 13 of the information processing device 10 receives the approval information from the terminal device via the network 40 and the communication unit 11.

In step S113, the control unit 13 of the information processing device 10 transmits the approval information received in step S112 to the vehicle 20 via the communication unit 11 and the network 40. Accordingly, the control unit 26 of the vehicle 20 receives the approval information in which the user approves that the delivery point is the second position, the approval information being information from the user who has confirmed the second image, via the network 40 and the communication unit 21.

In step S114, the control unit 26 of the vehicle 20 drives the vehicle 20 such that the vehicle 20 moves from the delivery point to the next destination based on the approval information received in step S113. The control unit 26 executes such a process even before the predetermined time elapses since the vehicle 20 left the package at the first position in step S100.

Figure 4:
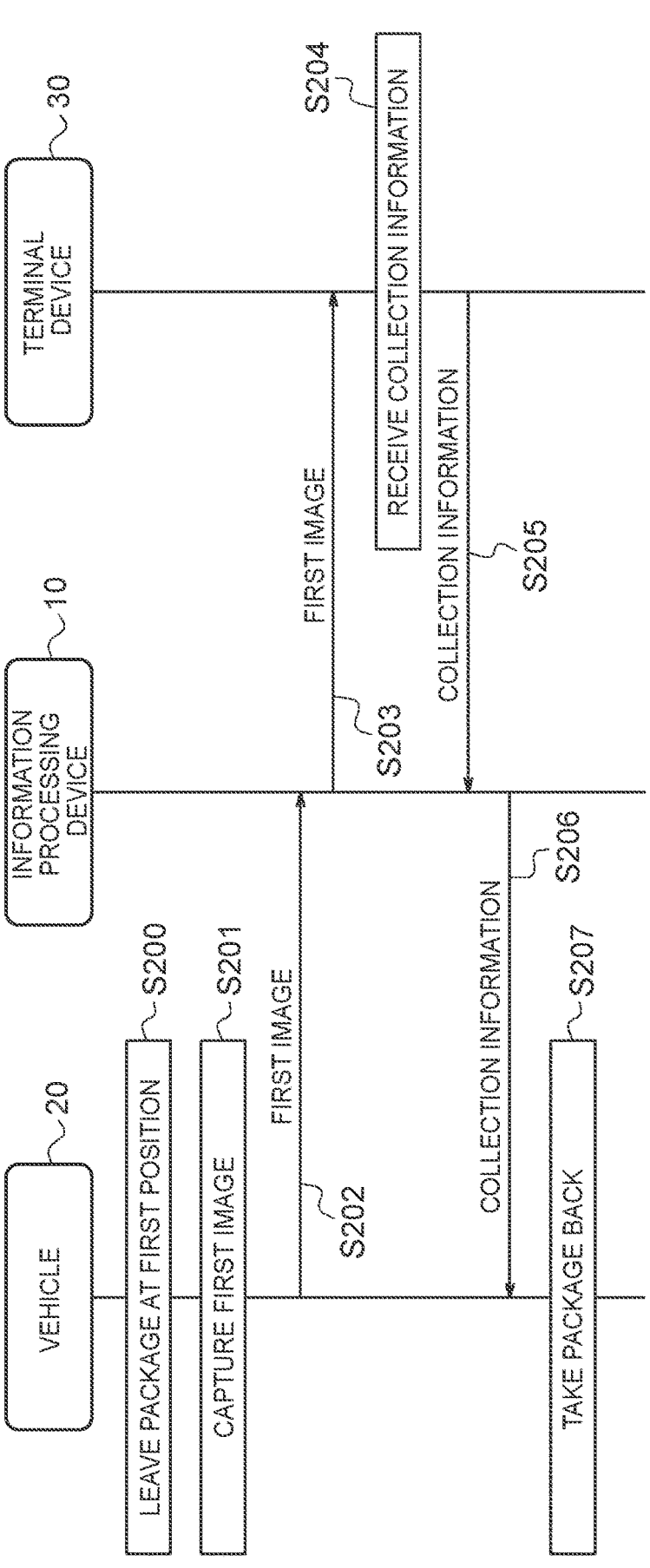
FIG. 4 is a sequence diagram for describing a second example of the information processing method executed by the information processing system shown in FIG. 1.

FIG. 4 is a sequence diagram for describing a second example of the information processing method executed by the information processing system 1 shown in FIG. 1. The second example of the information processing method executed by the information processing system 1 shown in FIG. 1 will be mainly described with reference to FIG. 4. The sequence diagram shown in FIG. 4 shows a processing flow of the information processing method executed by the information processing system 1 before the predetermined time elapses since the vehicle 20 left the package at the first position.

In step S200, the control unit 26 of the vehicle 20 drives the vehicle 20 such that the vehicle 20 autonomously delivers the package, determines any first position in the recipient's receiving address as the delivery point, and leaves the package at the first position.

In step S201, the control unit 26 of the vehicle 20 captures the first image when the vehicle 20 leaves the package at the first position using the imaging unit 24.

In step S202, the control unit 26 of the vehicle 20 transmits the first image captured using the imaging unit 24 in step S201 to the user. More specifically, the control unit 26 first transmits the first image to the information processing device 10 via the network 40 using the communication unit 21. Accordingly, the control unit 13 of the information processing device 10 receives the first image from the vehicle 20 via the network 40 and the communication unit 11.

In step S203, the control unit 13 of the information processing device 10 transmits the first image received in step S202 to the terminal device 30 via the communication unit 11 and the network 40. Accordingly, the control unit 35 of the terminal device 30 receives the first image when the vehicle 20 leaves the package at the first position from the information processing device 10 via the network 40 and the communication unit 31.

In step S204, the control unit 35 of the terminal device 30 displays the first image acquired in step S203 using the output unit 34, and allows the user to confirm the first image.

The control unit 35 receives collection information for the vehicle 20 to temporarily collect the package that has been left, the collection information being information from the user who has confirmed the first image, from the user using the input unit 33. For example, the control unit 35 receives the collection information when the user performs the selection operation on the item "collection" displayed on the output unit 34 while using the input unit 33 of the terminal device 30.

In step S205, the control unit 35 of the terminal device 30 transmits the collection information received in step S204 to the vehicle 20. More specifically, the control unit 35 first transmits the collection information to the information processing device 10 via the network 40 using the communication unit 31. Accordingly, the control unit 13 of the information processing device 10 receives the collection information from the terminal device 30 via the network 40 and the communication unit 11.

In step S206, the control unit 13 of the information processing device 10 transmits the collection information received in step S205 to the vehicle 20 via the communication unit 11 and the network 40. Accordingly, the control unit 26 of the vehicle 20 receives the collection information for the vehicle 20 to temporarily collect the package that has been left, the collection information being information from the user who has confirmed the first image, from the information processing device 10 via the network 40 and the communication unit 21.

In step S207, when the collection information is received from the user in step S206, the control unit 26 of the vehicle 20 drives the vehicle 20 such that the vehicle 20 takes the package back without leaving it.

Figure 5:
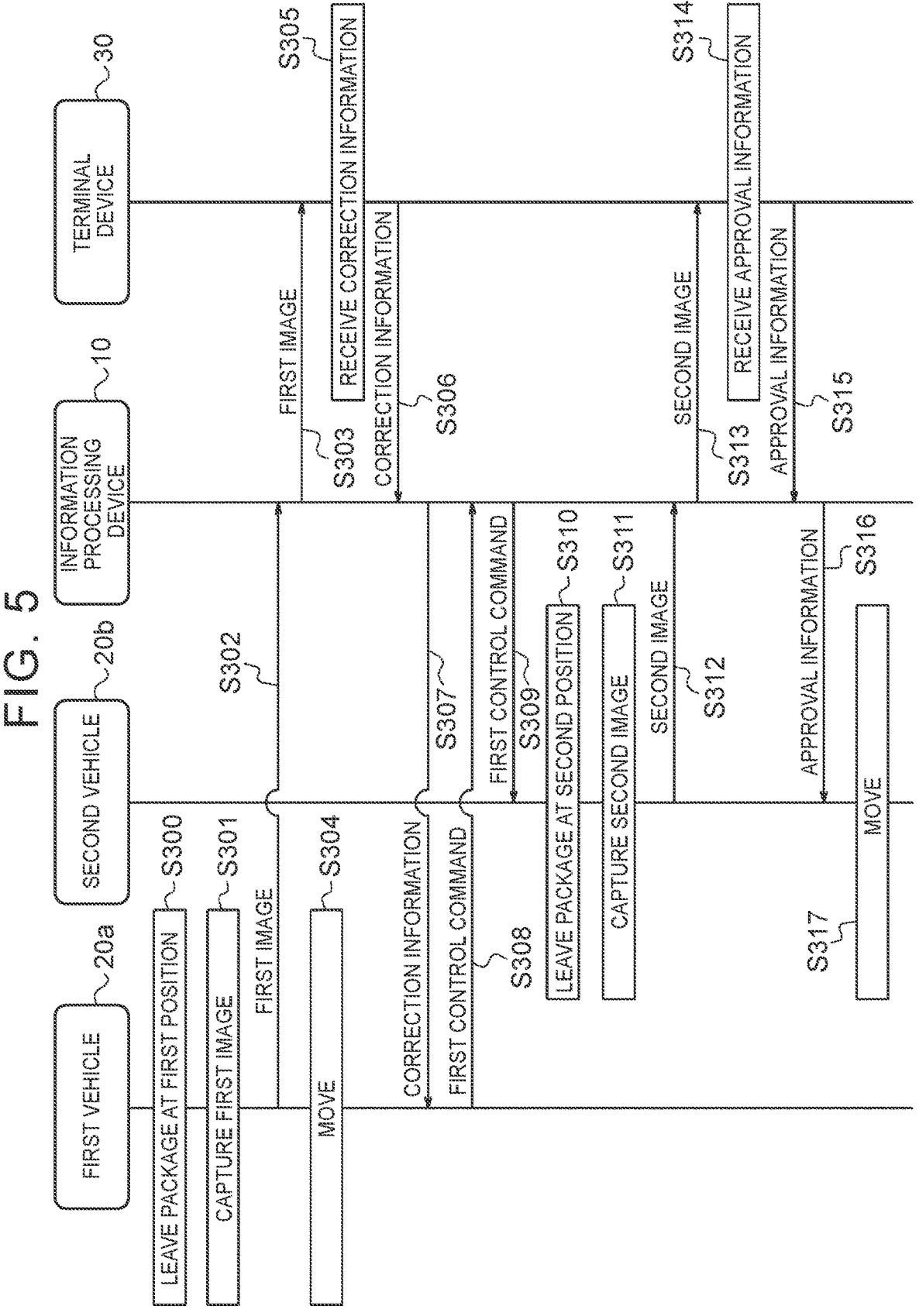
FIG. 5 is a sequence diagram for describing a third example of the information processing method executed by the information processing system shown in FIG. 1.

FIG. 5 is a sequence diagram for describing a third example of the information processing method executed by the information processing system 1 shown in FIG. 1. The third example of the information processing method executed by the information processing system 1 shown in FIG. 1 will be mainly described with reference to FIG. 5. The sequence diagram shown in FIG. 5 also includes a basic processing flow of the information processing method executed by the information processing system 1 after the predetermined time elapses since the vehicle 20 left the package at the first position. In FIG. 5, the vehicle 20 includes a first vehicle 20a and a second vehicle 20b.

In step S300, the control unit 26 of the first vehicle 20a drives the first vehicle 20a such that the first vehicle 20a autonomously delivers the package, determines any first position in the recipient's receiving address as the delivery point, and leaves the package at the first position.

In step S301, the control unit 26 of the first vehicle 20a captures the first image when the first vehicle 20a leaves the package at the first position using the imaging unit 24.

In step S302, the control unit 26 of the first vehicle 20a transmits the first image captured using the imaging unit 24 in step S301 to the user. More specifically, the control unit 26 first transmits the first image to the information processing device 10 via the network 40 using the communication unit 21. Accordingly, the control unit 13 of the information processing device 10 receives the first image from the first vehicle 20a via the network 40 and the communication unit 11.

In step S303, the control unit 13 of the information processing device 10 transmits the first image received in step S302 to the terminal device 30 via the communication unit 11 and the network 40. Accordingly, the control unit 35 of the terminal device 30 receives the first image when the first vehicle 20a leaves the package at the first position from the information processing device 10 via the network 40 and the communication unit 31.

In step S304, the control unit 26 of the first vehicle 20a drives the first vehicle 20a such that the first vehicle 20a moves from the delivery point to the next destination when the predetermined time elapses since the first vehicle 20a left the package at the first position in step S300.

In step S305, the control unit 35 of the terminal device 30 displays the first image acquired in step S303 using the output unit 34, and allows the user to confirm the first image. The control unit 35 receives correction information for driving the first vehicle 20a such that the delivery point is corrected from the first position to the second position, the correction information being information from the user who has confirmed the first image, using the input unit 33. For example, the control unit 35 receives the correction information when the user performs the selection operation on a position corresponding to the second position in the first image while using the input unit 33 of the terminal device 30.

In step S306, the control unit 35 of the terminal device 30 transmits the correction information received in step S305 to the first vehicle 20a. More specifically, the control unit 35 first transmits the correction information to the information processing device 10 via the network 40 using the communication unit 31. Accordingly, the control unit 13 of the information processing device 10 receives the correction information from the terminal device 30 via the network 40 and the communication unit 11.

In step S307, the control unit 13 of the information processing device 10 transmits the correction information received in step S306 to the first vehicle 20a via the communication unit 11 and the network 40. Accordingly, the control unit 26 of the first vehicle 20a receives the correction information for correcting the delivery point, the correction information being information from the user who has confirmed the first image, from the information processing device 10 via the network 40 and the communication unit 21. For example, the control unit 26 receives the correction information when the user performs the selection operation on the position corresponding to the second position in the first image while using the terminal device 30 from the information processing device 10 via the network 40 and the communication unit 21.

In step S308, when the control unit 26 of the first vehicle 20a receives the correction information after the predetermined time elapses since the first vehicle 20a left the package at the first position in step S307, the control unit 26 of the first vehicle 20a transmits a first control command such that another second vehicle 20b located closest to the delivery point corrects the delivery point from the first position to the second position based on the correction information. More specifically, the control unit 26 first transmits the first control command to the information processing device 10 via the network 40 using the communication unit 21. Accordingly, the control unit 13 of the information processing device 10 receives the first control command from the first vehicle 20a via the network 40 and the communication unit 11.

In step S309, the control unit 13 of the information processing device 10 transmits the first control command received in step S308 to the second vehicle 20b via the communication unit 11 and the network 40. Accordingly, the control unit 26 of the second vehicle 20b receives the first control command from the information processing device 10 via the network 40 and the communication unit 21.

In step S310, the control unit 26 of the second vehicle 20b drives the second vehicle 20b such that the delivery point is corrected from the first position to the second position based on the first control command acquired in step S309. That is, the control unit 26 drives the second vehicle 20b instead of the first vehicle 20a such that the second vehicle 20b leaves the package at the second position specified by the user.

In step S311, the control unit 26 of the second vehicle 20b captures the second image when the second vehicle 20b leaves the package at the second position by correction of the delivery point using the imaging unit 24.

In step S312, the control unit 26 of the second vehicle 20b transmits the second image captured using the imaging unit 24 in step S311 to the user. More specifically, the control unit 26 first transmits the second image to the information processing device 10 via the network 40 using the communication unit 21. Accordingly, the control unit 13 of the information processing device 10 receives the second image from the second vehicle 20b via the network 40 and the communication unit 11.

In step S313, the control unit 13 of the information processing device 10 transmits the second image received in step S312 to the terminal device 30 via the communication unit 11 and the network 40. Accordingly, the control unit 35 of the terminal device 30 receives the second image when the second vehicle 20b leaves the package at the second position by correction of the delivery point via the network 40 and the communication unit 31.

In step S314, the control unit 35 of the terminal device 30 displays the second image acquired in step S313 using the output unit 34, and allows the user to confirm the second image. The control unit 35 receives, using the input unit 33, approval information in which the user approves that the delivery point is the second position, the approval information being information from the user who has confirmed the second image.

In step S315, the control unit 35 of the terminal device 30 transmits the approval information received in step S314 to the second vehicle 20b. More specifically, the control unit 35 first transmits the approval information to the information processing device 10 via the network 40 using the communication unit 31. Accordingly, the control unit 13 of the information processing device 10 receives the approval information from the terminal device 30 via the network 40 and the communication unit 11.

In step S316, the control unit 13 of the information processing device 10 transmits the approval information received in step S315 to the second vehicle 20b via the communication unit 11 and the network 40. Accordingly, the control unit 26 of the second vehicle 20b receives the approval information in which the user approves that the delivery point is the second position, the approval information being information from the user who has confirmed the second image, via the network 40 and the communication unit 21.

In step S317, the control unit 26 of the second vehicle 20b drives the second vehicle 20b such that the second vehicle 20b moves from the delivery point to the next destination based on the approval information received in step S316.

Figure 6:
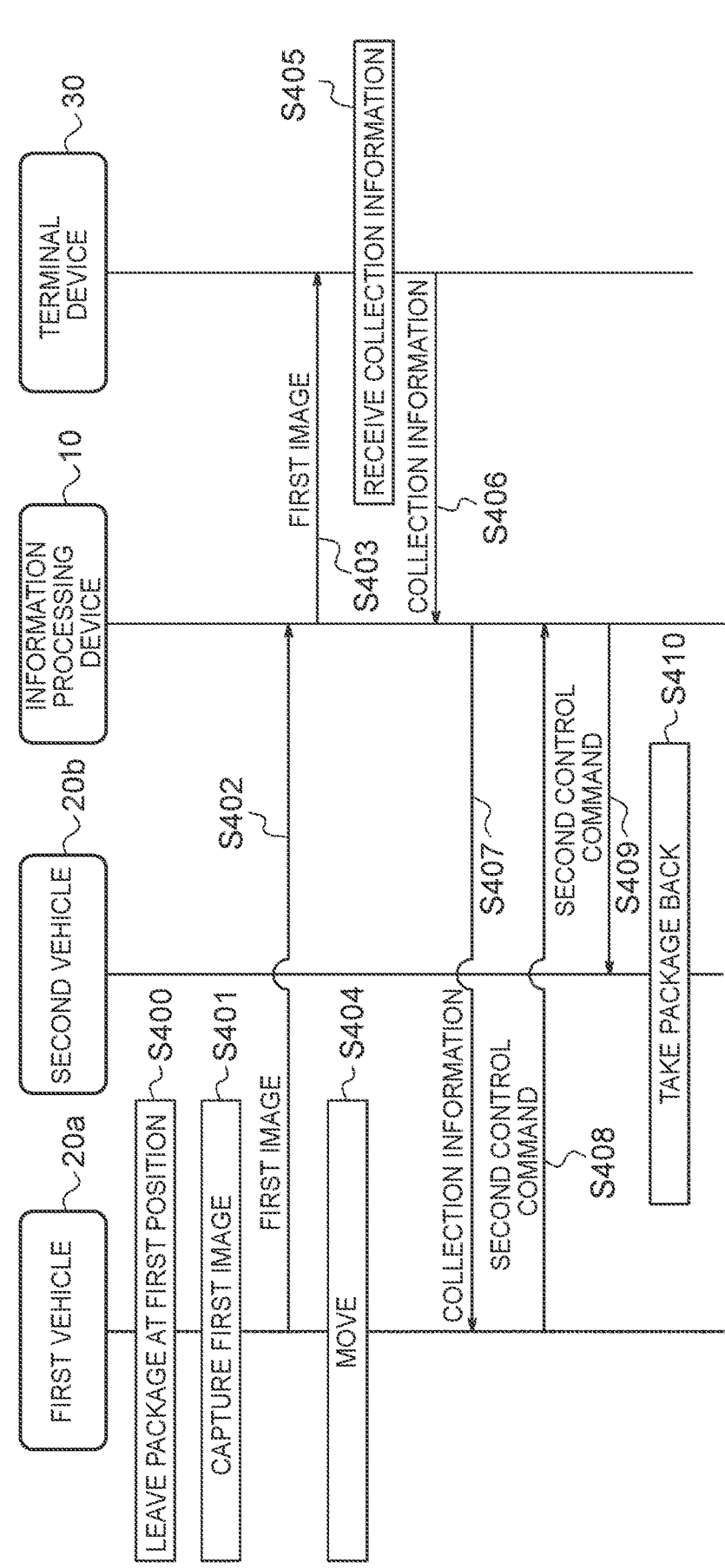
FIG. 6 is a sequence diagram for describing a fourth example of the information processing method executed by the information processing system shown in FIG. 1.

FIG. 6 is a sequence diagram for describing a fourth example of the information processing method executed by the information processing system 1 shown in FIG. 1. The fourth example of the information processing method executed by the information processing system 1 shown in FIG. 1 will be mainly described with reference to FIG. 6. The sequence diagram shown in FIG. 6 also includes a processing flow of the information processing method executed by the information processing system 1 after the predetermined time elapses since the vehicle 20 left the package at the first position. In FIG. 6, the vehicle 20 includes the first vehicle 20a and the second vehicle 20b.

In step S400, the control unit 26 of the first vehicle 20a drives the first vehicle 20a such that the first vehicle 20a autonomously delivers the package, determines any first position in the recipient's receiving address as the delivery point, and leaves the package at the first position.

In step S401, the control unit 26 of the first vehicle 20a captures the first image when the first vehicle 20a leaves the package at the first position using the imaging unit 24.

In step S402, the control unit 26 of the first vehicle 20a transmits the first image captured using the imaging unit 24 in step S401 to the user. More specifically, the control unit 26 first transmits the first image to the information processing device 10 via the network 40 using the communication unit 21. Accordingly, the control unit 13 of the information processing device 10 receives the first image from the first vehicle 20a via the network 40 and the communication unit 11.

In step S403, the control unit 13 of the information processing device 10 transmits the first image received in step S402 to the terminal device 30 via the communication unit 11 and the network 40. Accordingly, the control unit 35 of the terminal device 30 receives the first image when the first vehicle 20a leaves the package at the first position from the information processing device 10 via the network 40 and the communication unit 31.

In step S404, the control unit 26 of the first vehicle 20a drives the first vehicle 20a such that the first vehicle 20a moves from the delivery point to the next destination when the predetermined time elapses since the first vehicle 20a left the package at the first position in step S400.

In step S405, the control unit 35 of the terminal device 30 displays the first image acquired in step S403 using the output unit 34, and allows the user to confirm the first image. The control unit 35 receives collection information for the first vehicle 20a to temporarily collect the package that has been left, the collection information being information from the user who has confirmed the first image, from the user using the input unit 33. For example, the control unit 35 receives the collection information when the user performs the selection operation on the item "collection" displayed on the output unit 34 while using the input unit 33 of the terminal device 30.

In step S406, the control unit 35 of the terminal device 30 transmits the collection information received in step S405 to the first vehicle 20a. More specifically, the control unit 35 first transmits the collection information to the information processing device 10 via the network 40 using the communication unit 31. Accordingly, the control unit 13 of the information processing device 10 receives the collection information from the terminal device 30 via the network 40 and the communication unit 11.

In step S407, the control unit 13 of the information processing device 10 transmits the collection information received in step S406 to the first vehicle 20a via the communication unit 11 and the network 40. Accordingly, the control unit 26 of the first vehicle 20a receives the collection information for temporarily collecting the package that has been left, the collection information being information from the user who has confirmed the first image, from the information processing device 10 via the network 40 and the communication unit 21.

In step S408, when the control unit 26 of the first vehicle 20a receives the collection information after the predetermined time elapses since the first vehicle 20a left the package at the first position in step S407, the control unit 26 of the first vehicle 20a transmits a second control command such that the other second vehicle 20b located closest to the delivery point takes the package back without leaving it. More specifically, the control unit 26 first transmits the second control command to the information processing device 10 via the network 40 using the communication unit 21. Accordingly, the control unit 13 of the information processing device 10 receives the second control command from the first vehicle 20a via the network 40 and the communication unit 11.

In step S409, the control unit 13 of the information processing device 10 transmits the second control command received in step S408 to the second vehicle 20b via the communication unit 11 and the network 40. Accordingly, the control unit 26 of the second vehicle 20b receives the second control command from the information processing device 10 via the network 40 and the communication unit 21.

In step S410, the control unit 26 of the second vehicle 20b drives the second vehicle 20b such that the second vehicle 20b takes the package back without leaving it based on the second control command acquired in step S409. That is, the control unit 26 drives the second vehicle 20b instead of the first vehicle 20a such that the second vehicle 20b takes the package back without leaving it.

Figure 7:
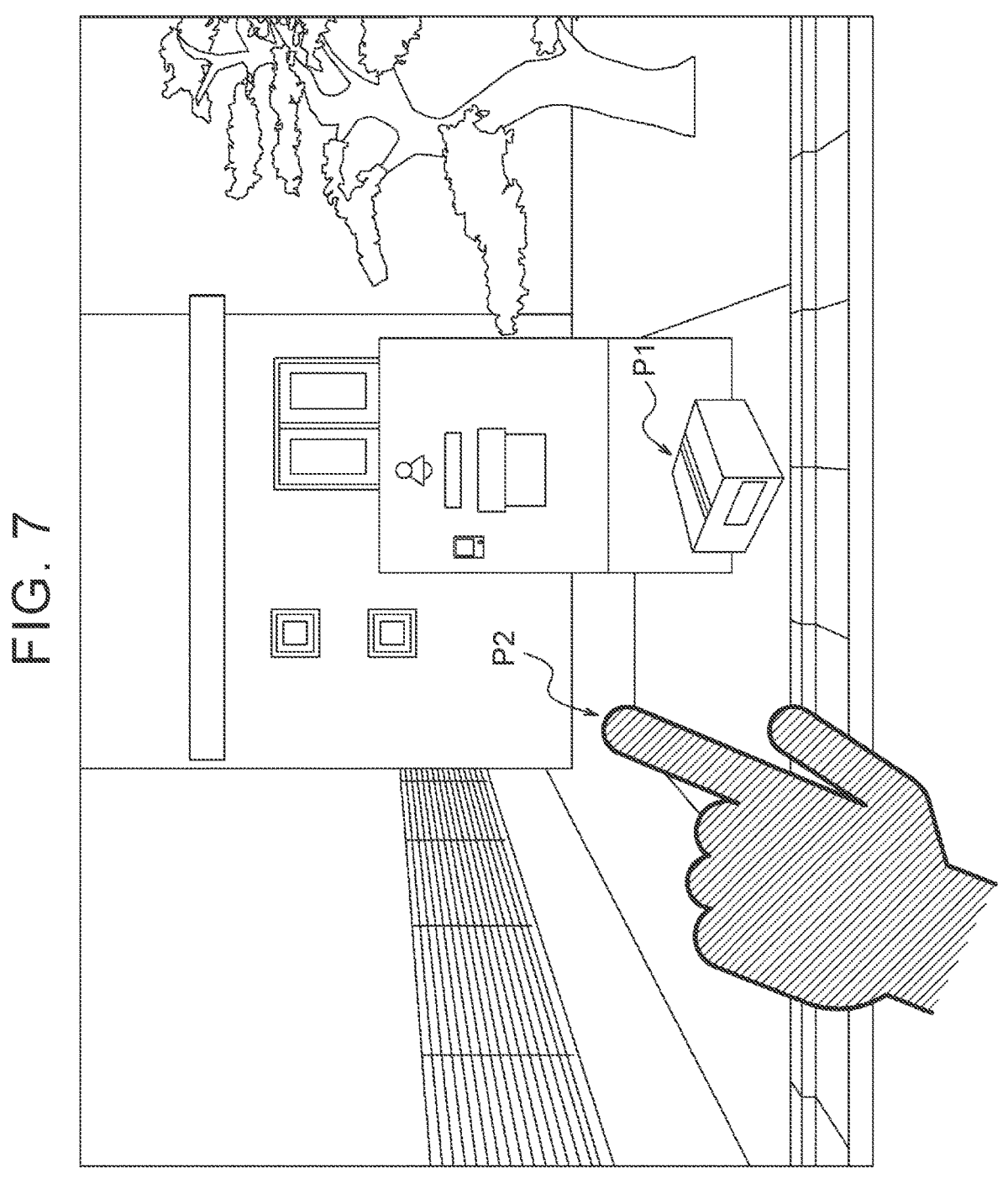

FIG. 7 is a schematic diagram for describing a processing content in the terminal device 30 shown in FIG. 1. An example of the processing content of step S104 in FIG. 3 will be mainly described with reference to FIG. 7, for example. FIG. 7 schematically shows the first image that is displayed on the output unit 34 of the terminal device 30 of the user and of which the delivery point at the front door of the home is captured as a subject, the first image including a first position P1 and a second position P2.

In the example of the processing content of step S104 in FIG. 3, the correction information includes information on the second position P2 specified by the selection operation by the user using the input unit 33 in the first image displayed on the output unit 34 of the terminal device 30 of the user. The first image displayed on the output unit 34 of the terminal device 30 of the user is displayed by an application installed on the terminal device 30 of the user.

The control unit 35 of the terminal device 30 displays the first image shown in FIG. 7 to the user using the output unit 34 as the user corrects the delivery point of the package from the first position P1 to the second position P2. The control unit 35 receives, using the input unit 33, the selection operation by the user for specifying the second position P2 on the first image displayed on the output unit 34. For example, the control unit 35 receives, using the input unit 33, the selection operation by the user for tapping the second position P2 at the front door of the home on the first image shown in FIG. 7 displayed on the output unit 34. The control unit 35 generates information on the second position P2 on the first image specified by the selection operation by the user as the correction information.

According to the embodiment as described above, it is possible to suppress the package from being left at a location that is not desired by the user. For example, the vehicle 20 corrects the delivery point to the second position specified by the user, so that the package can be accurately left at the delivery point where the user eventually desires. For example, when the package is left at a location other than the delivery point at the second position specified by the user, the package may be damaged by contact with a passerby, a passing vehicle, or the like. In addition, the package itself may be stolen. According to the embodiment, these possibilities are reduced to more safely deliver the package in a manner desired by the user. Therefore, the reliability from the user and the convenience for the user relative to the package delivery service are improved.

When the control unit 26 of the vehicle 20 receives the correction information before the predetermined time elapses, the information processing system 1 makes it possible to correct the delivery point using the same vehicle 20 by driving the vehicle 20 such that the delivery point is corrected based on the correction information. In the information processing system 1, only the same vehicle 20 as the vehicle 20 that has delivered the package is used from among the vehicles 20 included in the information processing system 1, and the delivery point can be finely corrected without using the other vehicle 20. Accordingly, the information processing system 1 can efficiently execute a correction process for the delivery point, and can reduce the cost associated with the correction process.

The control unit 26 of the vehicle 20 captures the second image when the vehicle 20 leaves the package at the second position and transmits the second image to the user, so that the user can easily confirm whether the package is accurately left at the second position specified by the user. Accordingly, the reliability from the user and the convenience for the user relative to the package delivery service are improved.

The control unit 26 of the vehicle 20 receives the correction information when the user performs the selection operation on the position corresponding to the second position in the first image, the user can easily specify the second position while operating the application of the terminal device 30 of the user. The vehicle 20 corrects the delivery point of the package to the second position specified by the user, and can more accurately leave the package at the location desired by the user. Accordingly, the reliability from the user and the convenience for the user relative to the package delivery service are further improved.

When the control unit 26 of the vehicle 20 receives the correction information after the predetermined time elapses, the first control command is transmitted to the other vehicle 20 located closest to the delivery point, so that the information processing system 1 allows the other vehicle 20 to correct the delivery point even after the vehicle 20 leaves the delivery point. Accordingly, the reliability from the user and the convenience for the user relative to the package delivery service are further improved.

When the control unit 26 of the vehicle 20 receives the collection information before the predetermined time elapses, the information processing system 1 makes it possible to collect the package using the same vehicle 20 by driving the vehicle 20 such that the vehicle 20 takes the package back without leaving it. The information processing system 1 makes it possible to collect the package without using the other vehicle 20 only by using the same vehicle 20 as the vehicle 20 that has delivered the package from among the vehicles 20 included in the information processing system 1. Accordingly, in the information processing system 1, the package can be safely and efficiently collected even when it is difficult for the user to receive the package that has been left due to a long-term absence or the like. Therefore, the information processing system 1 makes it possible to reduce the cost associated with the collection process, and to further improve the reliability from the user and the convenience for the user relative to the package delivery service.

When the control unit 26 of the vehicle 20 receives the collection information after the predetermined time elapses, the second control command is transmitted to the other vehicle 20 located closest to the delivery point, so that the information processing system 1 allows the other vehicle 20 to collect the package even after the vehicle 20 leaves the delivery point. Accordingly, the reliability from the user and the convenience for the user relative to the package delivery service are further improved.

According to the embodiment as described above, it is possible to suppress the package from being left at a location that is not desired by the user. For example, the terminal device 30 receives the correction information for driving the vehicle 20 such that the delivery point is corrected from the first position to the second position, so that the package can be accurately left using the vehicle 20 at a delivery point where the user eventually desires relative to the package delivery. For example, when the package is left at a location other than the delivery point at the second position specified by the user, the package may be damaged by contact with a passerby, a passing vehicle, or the like. In addition, the package itself may be stolen. According to the embodiment, these possibilities are reduced to more safely deliver the package in a manner desired by the user. Therefore, the reliability from the user and the convenience for the user relative to the package delivery service are improved.

The control unit 35 of the terminal device 30 receives the second image when the vehicle 20 leaves the package at the second position by correction of the delivery point, and causes the terminal device 30 to display the second image, so that the user can easily confirm whether the package is accurately left again at the second position specified by the user. Accordingly, the reliability from the user and the convenience for the user relative to the package delivery service are improved.

When the control unit 35 of the terminal device 30 receives the approval information and transmits the approval information to the vehicle 20, the user can notify the vehicle 20 of information indicating that the delivery of the package by the vehicle 20 may be completed using the approval information in which the intension of the user is reflected. The vehicle 20 can complete the delivery of the package according to the approval information in which the intension of the user is clearly reflected.

The control unit 35 of the terminal device 30 receives the correction information when the user performs the selection operation on the position corresponding to the second position in the first image, the user can easily specify the second position while operating the application of the terminal device 30 of the user. The vehicle 20 corrects the delivery point of the package to the second position specified by the user, and can more accurately leave the package at the location desired by the user. Accordingly, the reliability from the user and the convenience for the user relative to the package delivery service are further improved.

The control unit 35 of the terminal device 30 receives the collection information from the user and transmits the collection information to the vehicle 20, so that the information processing system 1 makes it possible to collect the package using the vehicle 20 based on the instruction from the user. Accordingly, in the information processing system 1, the package can be safely and efficiently collected even when it is difficult for the user to receive the package that has been left due to a long-term absence or the like. Therefore, the information processing system 1 makes it possible to further improve the reliability from the user and the convenience for the user relative to the package delivery service.

Although the present disclosure has been described above based on the drawings and the embodiment, it should be noted that those skilled in the art can make various modifications and alterations thereto based on the present disclosure. It should be noted, therefore, that these modifications and alterations are within the scope of the present disclosure. For example, the functions, etc. included in the configurations, steps, or the like can be rearranged so as not to be logically inconsistent, and a plurality of configurations, steps, or the like can be combined into one or divided.

For example, at least a part of the processing operations executed in the vehicle 20 in the above embodiment may be executed in the information processing device 10 or the terminal device 30. For example, instead of the vehicle 20, the information processing device 10 itself may execute the above-described series of processing operations regarding the vehicle 20. In this case, the information processing device 10 executes each step in each of the above sequence diagrams while transmitting and receiving information necessary for the processes to and from the vehicle 20. At least a part of the processing operations executed in the information processing device 10 or the terminal device 30 may be executed in the vehicle 20.

For example, a general-purpose electronic device such as a smartphone or a computer may function as the vehicle 20 according to the above embodiment. Specifically, a program describing processing contents for realizing each function of the vehicle 20 according to the above embodiment is stored in the memory of the electronic device, and the program is read and executed by the processor of the electronic device. Thus, the disclosure according to the embodiment can also be realized as the program that can be executed by the processor.

Alternatively, the disclosure according to the embodiment can be realized as a non-transitory computer-readable medium for storing a program executable by one or more processors to cause the vehicle 20 or the like according to the embodiment to execute each function. It should be understood that the above configurations are also included in the scope of the present disclosure.

For example, the information processing device 10 described in the above embodiment may be mounted on the vehicle 20. With the configuration above, the information processing device 10 may directly perform information communication with the vehicle 20 without the network 40.

In the above embodiment, it has been described that the vehicle 20 indirectly transmits and receives the information to and from the terminal device 30 of the user via the information processing device 10. However, the present disclosure is not limited to this. The vehicle 20 may directly transmit and receive the information to and from the terminal device 30 without going through the information processing device 10. That is, the information processing system 1 may be composed of the vehicle 20 and the terminal device 30, and may not include the information processing device 10.

For example, the control unit 26 of the vehicle 20 may directly transmit the first image to the terminal device 30 using the communication unit 21. The control unit 35 of the terminal device 30 may directly receive the first image from the vehicle 20 using the communication unit 31.

For example, the control unit 26 of the vehicle 20 may directly receive the correction information from the terminal device 30 using the communication unit 21. The control unit 35 of the terminal device 30 may directly transmit the correction information to the vehicle 20 using the communication unit 31.

For example, the control unit 26 of the vehicle 20 may directly receive the collection information from the terminal device 30 using the communication unit 21. The control unit 35 of the terminal device 30 may directly transmit the collection information to the vehicle 20 using the communication unit 31.

For example, the control unit 26 of the vehicle 20 may directly transmit the second image to the terminal device 30 using the communication unit 21. The control unit 35 of the terminal device 30 may directly receive the second image from the vehicle 20 using the communication unit 31.

For example, the control unit 26 of the vehicle 20 may directly receive the approval information from the terminal device 30 using the communication unit 21. The control unit 35 of the terminal device 30 may directly transmit the approval information to the vehicle 20 using the communication unit 31.

In the above embodiment, it has been described that the first vehicle 20a indirectly transmits the control command to the second vehicle 20b via the information processing device 10. However, the present disclosure is not limited to this. The first vehicle 20a may directly transmit the control command to the second vehicle 20b without going through the information processing device 10.

For example, the control unit 26 of the first vehicle 20a may directly transmit the first control command to the second vehicle 20b using the communication unit 21. The control unit 26 of the second vehicle 20b may directly receive the first control command from the first vehicle 20a using the communication unit 21.

For example, the control unit 26 of the first vehicle 20a may directly transmit the second control command to the second vehicle 20b using the communication unit 21. The control unit 26 of the second vehicle 20b may directly receive the second control command from the first vehicle 20a using the communication unit 21.

In the above embodiment, it has been described that the information is transmitted and received using the terminal device 30 of one user. However, the present disclosure is not limited to this. The information processing system 1 may include a first terminal device 30a of a recipient who receives delivery of a package and a second terminal device 30b of a sender who sends the package.

For example, the control unit 26 of the vehicle 20 may directly or indirectly transmit the first image to both the first terminal device 30a and the second terminal device 30b using the communication unit 21. The control unit 35 of the first terminal device 30a may directly or indirectly receive the first image from the vehicle 20 using the communication unit 31. The control unit 35 of the second terminal device 30b may directly or indirectly receive the first image from the vehicle 20 using the communication unit 31.

For example, the control unit 26 of the vehicle 20 may directly or indirectly receive the correction information from at least one of the first terminal device 30a and the second terminal device 30b using the communication unit 21. The control unit 35 of the first terminal device 30a may directly or indirectly transmit the correction information to the vehicle 20 using the communication unit 31. The control unit 35 of the second terminal device 30b may directly or indirectly transmit the correction information to the vehicle 20 using the communication unit 31.

The vehicle 20 may correct the delivery point based on the correction information from any of the first terminal device 30a and the second terminal device 30b, or may correct the delivery point based on the correction information from both the first terminal device 30a and the second terminal device 30b. For example, the vehicle 20 may define a priority for a recipient and a sender, and correct the delivery point based on the correction information from a user with high priority, or may correct the delivery point each time the correction information is acquired.

For example, the control unit 26 of the vehicle 20 may directly or indirectly receive the collection information from at least one of the first terminal device 30a and the second terminal device 30b using the communication unit 21. The control unit 35 of the first terminal device 30a may directly or indirectly transmit the collection information to the vehicle 20 using the communication unit 31. The control unit 35 of the second terminal device 30b may directly or indirectly transmit the collection information to the vehicle 20 using the communication unit 31.

The vehicle 20 may take the package back based on the collection information from any of the first terminal device 30a and the second terminal device 30b, or may take the package back based on the collection information from both the first terminal device 30a and the second terminal device 30b. For example, the vehicle 20 may define a priority for a recipient and a sender, and take the package back based on the collection information from a user with high priority, or may take the package back by acquiring the collection information from both the first terminal device 30a and the second terminal device 30b.

For example, the control unit 26 of the vehicle 20 may directly or indirectly transmit the second image to both the first terminal device 30a and the second terminal device 30b using the communication unit 21. The control unit 35 of the first terminal device 30a may directly or indirectly receive the second image from the vehicle 20 using the communication unit 31. The control unit 35 of the second terminal device 30b may directly or indirectly receive the second image from the vehicle 20 using the communication unit 31.

For example, the control unit 26 of the vehicle 20 may directly or indirectly receive the approval information from at least one of the first terminal device 30a and the second terminal device 30b using the communication unit 21. The control unit 35 of the first terminal device 30a may directly or indirectly transmit the approval information to the vehicle 20 using the communication unit 31. The control unit 35 of the second terminal device 30b may directly or indirectly transmit the approval information to the vehicle 20 using the communication unit 31.

The vehicle 20 may complete the delivery of the package based on the approval information from any of the first terminal device 30a and the second terminal device 30b, or may complete the delivery of the package based on the approval information from both the first terminal device 30a and the second terminal device 30b. For example, the vehicle 20 may define a priority for a recipient and a sender, and complete the delivery of the package based on the approval information from a user with high priority, or may complete the delivery of the package by acquiring the approval information from both the first terminal device 30a and the second terminal device 30b.

In the above embodiment, it has been described that the control unit 26 of the vehicle 20 captures the second image and transmits the second image to the user. However, the present disclosure is not limited to this. The control unit 26 does not need to execute such a process. That is, the control unit 26 does not need to capture the second image, and even when the second image is captured, the control unit 26 does not need to transmit the second image to the user.

In the above embodiment, it has been described that the control unit 26 of the vehicle 20 completes the delivery of the package when receiving the approval information from the user. However, the present disclosure is not limited to this. The control unit 26 does not need to execute such a process. That is, the information processing system 1 does not need to be configured such that the user can input the approval information on the terminal device 30.

In the above embodiment, it has been described that the control unit 26 of the vehicle 20 drives the vehicle 20 such that the vehicle 20 takes the package back without leaving it when the collection information is received from the user. However, the present disclosure is not limited to this. The control unit 26 does not need to execute such a process. That is, the information processing system 1 does not need to be configured such that the user can input the collection information on the terminal device 30.

In the above embodiment, it has been described that when the control unit 26 of the first vehicle 20a receives the correction information after the predetermined time elapses, the first control command is transmitted to the second vehicle 20b that is the other vehicle 20 to cause the delivery point to be corrected. However, the present disclosure is not limited to this. Even after the predetermined time elapses, the control unit 26 of the first vehicle 20a may drive the first vehicle 20a such that the first vehicle 20a returns to the delivery point again, and the delivery point is corrected from the first position to the second position based on the received correction information.

In the above embodiment, it has been described that when the control unit 26 of the first vehicle 20a receives the collection information after the predetermined time elapses, the second control command is transmitted to the second vehicle 20b that is the other vehicle 20 to cause the package to be taken back without leaving it. However, the present disclosure is not limited to this. The control unit 26 of the first vehicle 20a may drive the first vehicle 20a such that the first vehicle 20a returns to the delivery point again and take the package back from the delivery point based on the received collection information even after the predetermined time elapses.

In the above embodiment, it has been described that the control unit 35 of the terminal device 30 receives the second image and causes the terminal device 30 to display the second image. However, the present disclosure is not limited to this. The control unit 35 does not need to execute such a process. That is, even when the second image is received, the control unit 35 may only store the second image in the storage unit 32 and may not display the second image on the output unit 34 of the terminal device 30.

A part of the embodiment of the present disclosure is shown as an example below. However, it should be noted that embodiment of the present disclosure is not limited to these.

APPENDIX 1

A vehicle that autonomously delivers a package includes
a control unit that captures a first image when the vehicle leaves the package at a first position and transmits the first image to a user and drives the vehicle such that a delivery point is corrected from the first position to a second position based on correction information for correcting the delivery point, the correction information being information from the user who has confirmed the first image, when receiving the correction information.

APPENDIX 2

In the vehicle according to Appendix 1,
the control unit drives the vehicle such that the delivery point is corrected from the first position to the second position based on the correction information when the correction information is received before a predetermined time elapses since the vehicle left the package at the first position.

APPENDIX 3

In the vehicle according to Appendix 1 or 2,
the control unit captures a second image when the vehicle leaves the package at the second position by correction of the delivery point, and transmits the second image to the user.

APPENDIX 4

In the vehicle according to any one of Appendices 1 to 3,
the control unit receives the correction information when the user performs a selection operation on a position corresponding to the second position in the first image while using a terminal device.

APPENDIX 5

In the vehicle according to any one of Appendices 1 to 4,
the control unit transmits a first control command such that another vehicle located closest to the delivery point corrects the delivery point from the first position to the second position based on the correction information when the correction information is received after a predetermined time elapses since the vehicle left the package at the first position.

APPENDIX 6

In the vehicle according to any one of Appendices 1 to 5,
the control unit drives the vehicle such that the vehicle takes the package back without leaving the package when collection information for temporarily collecting the package that has been left is received from the user before a predetermined time elapses since the vehicle left the package at the first position.

APPENDIX 7

In the vehicle according to Appendix 6,
the control unit transmits a second control command such that another vehicle located closest to the delivery point takes the package back without leaving the package when the collection information is received after the predetermined time elapses.

APPENDIX 8

An information processing system includes:
the vehicle according to any one of Appendices 1 to 7; and
a terminal device used by the user, the terminal device receiving the correction information.

APPENDIX 9

A program that causes a vehicle that autonomously delivers a package to execute an operation including:
capturing a first image when the vehicle leaves the package at a first position and transmitting the first image to a user;

receiving correction information for correcting a delivery point, the correction information being information from the user who has confirmed the first image; and driving the vehicle such that the delivery point is corrected from the first position to a second position based on the correction information.

APPENDIX 10

In the program according to Appendix 9,
the operation includes driving the vehicle such that the delivery point is corrected from the first position to the second position based on the correction information when the correction information is received before a predetermined time elapses since the vehicle left the package at the first position.

APPENDIX 11

In the program according to Appendix 9 or 10,
the operation includes capturing a second image when the vehicle leaves the package at the second position by correction of the delivery point and transmitting the second image to the user.

APPENDIX 12

In the program according to any one of Appendices 9 to 11,
the operation includes receiving the correction information when the user performs a selection operation on a position corresponding to the second position in the first image while using a terminal device.

APPENDIX 13

In the program according to any one of Appendices 9 to 12,
the operation includes transmitting a first control command such that another vehicle located closest to the delivery point corrects the delivery point from the first position to the second position based on the correction information when the correction information is received after a predetermined time elapses since the vehicle left the package at the first position.

APPENDIX 14

In the program according to any one of Appendices 9 to 13,
the operation includes driving the vehicle such that the vehicle takes the package back without leaving the package when collection information for temporarily collecting the package that has been left is received from the user before a predetermined time elapses since the vehicle left the package at the first position.

APPENDIX 15

In the program according to Appendix 14,
the operation includes transmitting a second control command such that another vehicle located closest to the delivery point takes the package back without leaving the package when the collection information is received after the predetermined time elapses.

APPENDIX 16

A terminal device of a user that is connected to a vehicle that autonomously delivers a package so as to be able to communicate with the vehicle includes a control unit that receives a first image when the vehicle leaves the package at a first position, receives correction information for driving the vehicle such that a delivery point is corrected from the first position to a second position, the correction information being information from the user who has confirmed the first image, and transmits the correction information to the vehicle.

APPENDIX 17

In the terminal device according to Appendix 16,
the control unit receives a second image when the vehicle leaves the package at the second position by correction of the delivery point, and causes the terminal device to display the second image.

APPENDIX 18

In the terminal device according to Appendix 17,
the control unit receives approval information for approving that the delivery point is the second position, the approval information being information from the user who has confirmed the second image, and transmits the approval information to the vehicle.

APPENDIX 19

In the terminal device according to any one of Appendices 16 to 18,
the control unit receives the correction information when the user performs a selection operation on a position corresponding to the second position in the first image while using the terminal device.

APPENDIX 20

In the terminal device according to any one of Appendices 16 to 19,
the control unit receives, from the user, collection information for the vehicle to temporarily collect the package that has been left, and transmits the collection information to the vehicle.

What is claimed is:
1. A vehicle that autonomously delivers a package, the vehicle comprising:
one or more processors that are configured to:
capture a first image when the vehicle leaves the package at a first position and transmits the first image to a user and drives the vehicle such that a delivery point is corrected from the first position to a second position based on correction information for correcting the delivery point, the correction information being information indicative of confirmation of the first image, when receiving the correction information; and
transmit a first control command such that another vehicle located closest to the delivery point corrects the delivery point from the first position to the second position based on the correction information when the correction information is received after a predetermined time elapses since the vehicle left the package at the first position.
2. The vehicle according to claim 1, wherein the one or more processors are further configured to drive the vehicle such that the delivery point is corrected from the first position to the second position based on the correction information when the correction information is received before the predetermined time elapses since the vehicle left the package at the first position.

3. The vehicle according to claim 1, wherein the one or more processors are further configured to capture a second image when the vehicle leaves the package at the second position by correction of the delivery point, and transmit the second image to the user.

4. The vehicle according to claim 1, wherein the one or more processors are further configured to receive the correction information when the user performs a selection operation on a position corresponding to the second position in the first image while using a terminal device.

5. The vehicle according to claim 1, wherein the one or more processors are further configured to drive the vehicle such that the vehicle takes the package back without leaving the package when collection information for temporarily collecting the package that has been left is received from the user before the predetermined time elapses since the vehicle left the package at the first position.

6. The vehicle according to claim 5, wherein the one or more processors are further configured to transmit a second control command such that the another vehicle located closest to the delivery point takes the package back without leaving the package when the collection information is received after the predetermined time elapses.

7. An information processing system comprising:
the vehicle according to claim 1; and
a terminal device used by the user, the terminal device receiving the correction information.

8. A non-transitory computer-readable medium including instructions that, when executed by a processor, cause the processor to perform a method that causes a vehicle that autonomously delivers a package to execute one or more operations including:
program instructions for capturing a first image when the vehicle leaves the package at a first position and transmitting the first image to a user;
program instructions for receiving correction information for correcting a delivery point, the correction information being information indicative of confirmation of the first image;
program instructions for driving the vehicle such that the delivery point is corrected from the first position to a second position based on the correction information; and
program instructions for transmitting a first control command such that another vehicle located closest to the delivery point corrects the delivery point from the first position to the second position based on the correction information when the correction information is received after a predetermined time elapses since the vehicle left the package at the first position.

9. The non-transitory computer-readable medium according to claim 8, wherein the one or more operations further includes program instructions for driving the vehicle such that the delivery point is corrected from the first position to the second position based on the correction information when the correction information is received before the predetermined time elapses since the vehicle left the package at the first position.

10. The non-transitory computer-readable medium according to claim 8, wherein the one or more operations further includes program instructions for capturing a second image when the vehicle leaves the package at the second position by correction of the delivery point and transmitting the second image to the user.

11. The non-transitory computer-readable medium according to claim 8, wherein the one or more operations further includes program instructions for receiving the correction information when the user performs a selection operation on a position corresponding to the second position in the first image while using a terminal device.

12. The non-transitory computer-readable medium according to claim 8, wherein the one or more operations further includes program instructions for driving the vehicle such that the vehicle takes the package back without leaving the package when collection information for temporarily collecting the package that has been left is received from the user before the predetermined time elapses since the vehicle left the package at the first position.

13. The non-transitory computer-readable medium according to claim 12, wherein the one or more operations further includes program instructions for transmitting a second control command such that the another vehicle located closest to the delivery point takes the package back without leaving the package when the collection information is received after the predetermined time elapses.

14. A terminal device of a user that is connected to a vehicle that autonomously delivers a package so as to be able to communicate with the vehicle, the terminal device comprising:
one or more processors that are configured to:
receive a first image when the vehicle leaves the package at a first position, receives correction information for driving the vehicle such that a delivery point is corrected from the first position to a second position, the correction information being information indicative of confirmation of the first image, and transmits the correction information to the vehicle.

15. The terminal device according to claim 14, wherein the one or more processors are further configured to receive a second image when the vehicle leaves the package at the second position by correction of the delivery point, and cause the terminal device to display the second image.

16. The terminal device according to claim 15, wherein the one or more processors are further configured to receive approval information for approving that the delivery point is the second position, the approval information being information from the user who has confirmed the second image, and transmit the approval information to the vehicle.

17. The terminal device according to claim 14, wherein the one or more processors are further configured to receive the correction information when the user performs a selection operation on a position corresponding to the second position in the first image while using the terminal device.

18. The terminal device according to claim 14, wherein the one or more processors are further configured to receive, from the user, collection information for the vehicle to temporarily collect the package that has been left, and transmit the collection information to the vehicle.

* * * * *